Feb. 3, 1970 H. SCHLUTER 3,493,690
CONTROLS FOR A MULTI-STAGE CROSSPOINT ARRANGEMENT
Filed Aug. 10, 1966 2 Sheets-Sheet 1

United States Patent Office 3,493,690
Patented Feb. 3, 1970

3,493,690

CONTROLS FOR A MULTI-STAGE CROSSPOINT ARRANGEMENT

Heinz Schluter, Stuttgart, Germany, assignor to International Standard Electric Corporation, New York, N.Y., a corporation of Delaware Filed Aug. 10, 1966, Ser. No. 571,497
Claims priority, application Germany, Aug. 14, 1965, St 24,269
Int. Cl. H04m *3/00*
U.S. Cl. 179—18 5 Claims

ABSTRACT OF THE DISCLOSURE

A system is provided for simultaneously through-switching all the crosspoint elements of a connecting or crosspoint path or link arrangement. The system operates on the guide wire principle with the use of offering and access, or acceptance, signals. Additional switching wires are avoided by using the access signal, as it appears on the guide wire, for marking the crosspoint elements to be subjected to through-switching.

This invention relates to multi-stage crosspoint networks and more particularly to controls therefor.

This invention relates to the guide wire type of network control. In greater detail, a guide wire network is one wherein a route searching network of control wires run through a switching network in parallel with the talking conductors. To select a connection or complete a switch path, an offering signal is applied to a guide wire on one side of the route searching network. The offering signal fans out over all available paths until it reaches the far side of the network.

Any suitable equipment at the far side applies a potential to one of the points, and a particular path in the fanout which terminates at that point is then selected in a reverse direction. The potential coming back over the selected path is sometimes called an acceptance or access potential.

For more information on one exemplary guide wire network, reference may be had to German Patent No. 1,166,284.

One difficulty with such guide wire networks is that it takes too long to switch-through if the returning path must operate crosspoints stage by stage. Therefore, to improve these guide wire networks, it is desirable to switch all crosspoints at the same time, if possible; or, if that is not possible, it is desirable to simultaneously switch the crosspoints in as many stages as possible.

One way of doing this, described in German Patent 1,048,956, is to provide additional switching wires. Another way is to provide a common control which is capable of simultaneously operating crosspoints. Each of these and other known systems add an expensive element to a network solely to gain switching time.

Accordingly, an object is to provide new and improved guide wire networks. Another object is to increase switching speed without adding extra controls.

In keeping with an aspect of the invention, these and other objects are accomplished by an evaluation switching means operated responsive to access potentials appearing on the guide wires. Then a through-switching voltage is applied to all crosspoints which are to be operated simultaneously.

The above mentioned and other features and objects of this invention and the manner of obtaining them will become more apparent, and the invention itself will be best understood by reference to the following description of an embodiment of the invention taken in conjunction with the accompaying drawings, in which:

FIG. 1 shows a route searching network imposed upon a switching network. That is, each wire shown here runs parallel to and represents a pair of talking conductors.

Figure 1:
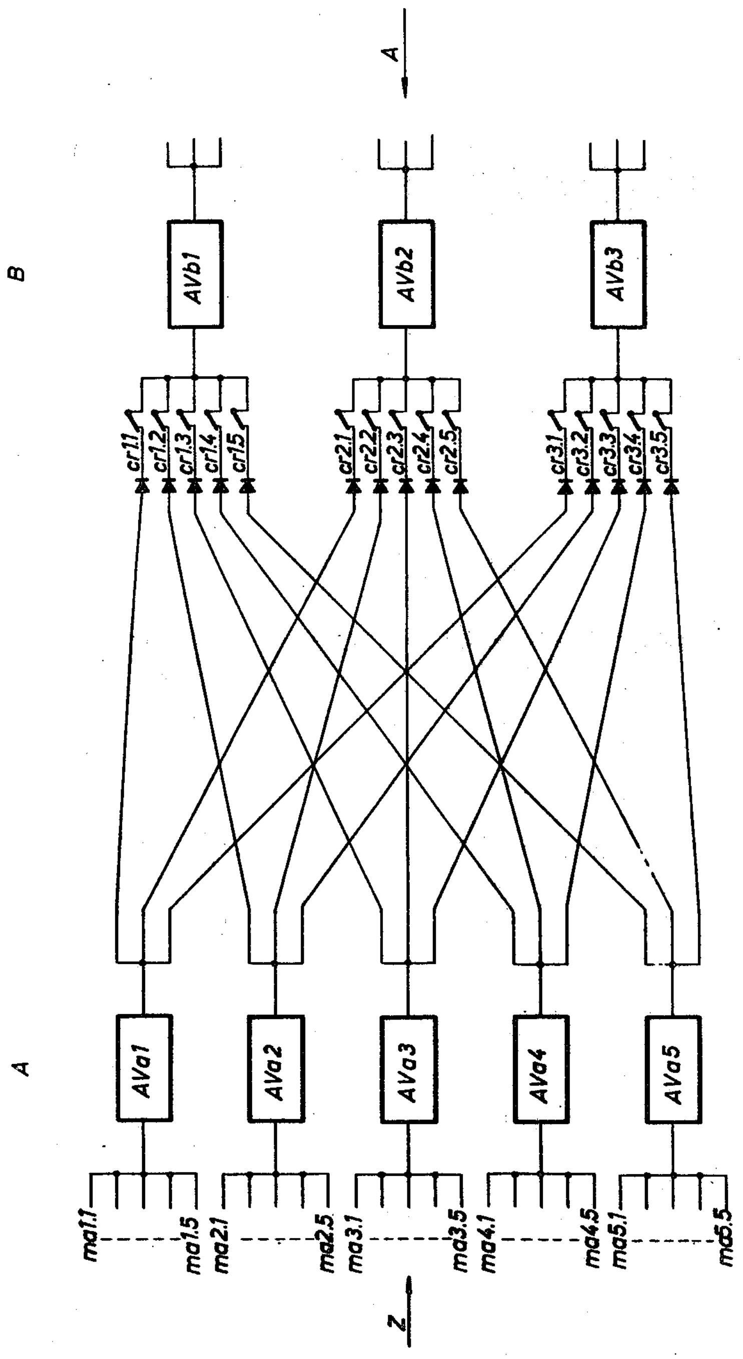
FIG. 1 is a layout of a plurality of guide wires showing the principle of the invention.

The network of FIG. 1 shows an exemplary two stages A and B which could be any two of many stages. The drawing shows five blocks AV*a*1 . . . AV*a*5 as being connected to three stages AV*b*1 . . . AV*b*3. Each block may represent a simple transistor amplifier for feeding the offering signal in a forward direction.

In accordance with the link arrangement, each offering amplifier of stage B is connected at any given time during a search via one guide wire, which is associated with the respective link, to each offering amplifier of stage A. Each of these guide wires includes a break contact *cr* of a holding relay. This break contact opens as soon as the link associated with the respective guide wire becomes busy. According to the links extending to the other switching stages of the switching grid, three guide wires are indicated at each of the offering amplifiers AV*b*1 to AV*b*3 as extending in the direction towards the right. The offering amplifiers of stage A, the first stage, are connected to five guide wires corresponding to the five inputs of each crosspoint multiple of the second stage A.

From the destination of a desired connection (e.g. from all idle registers), an offering signal is fanned out in the direction indicated by the arrow A via guide wires associated to idle links, toward the offering amplifiers of stage B. Assume that these offering amplifiers are AV*b*2 and AV*b*3. The offering signal is then amplified and transferred to stage A via all guide wires extending from these two offering amplifiers if the contact *cr* is closed to indicate the idle state of the associated link. In this way, the offering signal reaches all of the offering amplifiers of stage A accessible over idle links. These amplifiers apply the offering signal to the corresponding outgoing guide wires *ma*1.1 to *ma*5.5.

To one of the guide wires conducting the offering signal, and in the direction indicated by the arrow Z, there is now applied an access signal, e.g. through the guide wire *ma*2.5. At the offering amplifier AV*a*2, there will now appear a coincidence between the access signal and the offering signal. The coincidence causes the amplifier to apply the access signal to the guide wires extending from it toward the source of the offering side (hence toward the right).

In the course of this, a potential of the one polarity is applied to these guide wires via a resistor. Serving as the offering signal, this potential is blocked by the directly applied potential of the other polarity serving as the access signal. In this way, the access signal is applied to the offering amplifiers of stage B. Coincidence in stage B between the offering and the access signal, however, can only appear in the marking junctions, i.e. junctions which have previously received the offering signal. In this particular example, the marking junctions are as formed by the offering amplifiers AV*b*2 and AV*b*3, which were previously marked by the offering signal. As it is acted upon by the offering and the access signal, one of these offering amplifiers is selected and marked by a control device. This selection causes an access signal to be applied to the guide wires extending from it in the direction of arrow Z toward the offering side. The same processes are repeated in each stage of the switching grid.

When a coincidence occurs between the offering and the access signals, the marking junctions of each stage signal provides a marker performing the selection of one of these marking junctions. If the crosspoint or link arrangement is subdivided into horizontal sections by switching highways, it is possible to reduce the selecting time and to simplify the wiring or other circuitry between the offering amplifiers and the marker. The objective is, first of all, to enable the marker to select a highway including at least one marking junction in which there is established a coincidence between the offering and the access signals.

The selection of a particular marking junction in this switching highway is then effected by a control device assigned thereto and hereinafter referred to as highway control.

Figure 2:
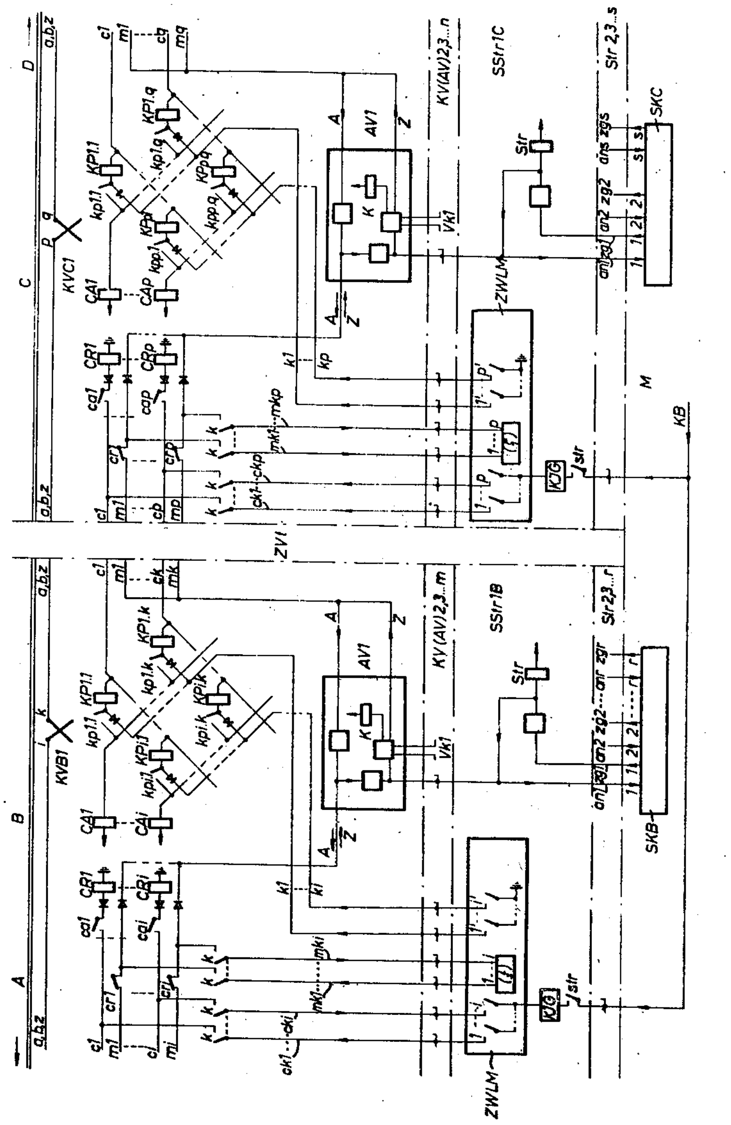
FIG. 2 shows the details of a circuit for selecting and operating crosspoints according to the principles of FIG. 1.

FIG. 2 shows two switching stages B and C of a multi-stage crosspoint or link arrangement in which both the path finding (route search) and the selection of marking junctions is performed in the way described hereinbefore. In stage B, there is only shown one crosspoint multiple KVB1 with its offering amplifier AV1 serving as the marking junction. The respective switching highway in stage B is composed of *m* number of crosspoint multiples. Each of these multiples has *i* number of inputs and *k* number of outputs (outlets), with the remaining ones being denoted by the designation KVB (AV) 2, 3 . . . *m*. The remaining ones of the total of *r* highways are denoted S*tr* 2, 3 . . . *r*.

In the same way, stage C shows only one crosspoint multiple KVC1 among the *n* number of crosspoint multiples. Each multiple has *p* inputs and *q* outputs (outlets). This crosspoint multiple belongs to the first one of the total of *s* highways.

The offering signal (negative potential) arrives over an idle guide wire *ml* . . . *mq* from the right-hand or offering side of the crosspoint or link arrangement via the stage D. This offering signal is then applied from the idle or free guide wires *ml* . . . *mq* to the offering amplifiers AV1 . . . AV*n* of the shown highway 1. Of course, all offering signals arrive in the same way on the other highways, provided that free or idle links are then available. The offering amplifier transfers the offering signal to the next adjacent stage (in this case stage B) via the idle guide wires *ml* . . . *mp*. As such transfer occurs, the contact *cr* is closed—to the offering amplifiers AV1 . . . AV*m* of the various highways of stage B. From this stage, the offering signal is transferred via the guide wires *ml* . . . *mi* in direction toward the access side (in this case to the stage A).

The access signal (ground or plus potential) is applied in an opposite direction from the stage A via idle or free guide wires *ml* . . . *mi*, to the respective accessible amplifiers AV1 . . . AV*m* of the individual highways of the stage B.

The equipment M below the lowermost dot-dashed line at the bottom of FIG. 2 is in a common control device called the central marker.

All of the offering amplifiers of stage B, in which there exists a coincidence between the offering and the access signals, initiate the starting of a highway selection chain SKB associated in the central marker M with stage B. The starting signal is sent via one line per highway, i.e. *an*1 . . . *anr*. This highway selection chain selects one among the many highways initiating the starting signal, e.g. the shown highway 1, via the corresponding control wire *zg*1, switches on the highway control SS*tr*1B with respect to the first highway of stage B. With the aid of a selection chain V*k*1, this highway control now selects an offering amplifier of the highway 1 initiating a starting, e.g. the shown offering amplifier AV1. On account of this, the relay K thereof is caused to operate. In addition thereto, the selected offering amplifier AV1 of stage B transfers the access signal via the guide wires *ml* . . . *mk*, to the switching stage C. The same processes are then performed in the stage C. If one highway extends over both switching stages B and C, the highway selection is omitted in stage C. An offering amplifier in stage C can be selected immediately upon arrival of the access signal.

Only one link is provided between each two crosspoint multiples of neighboring switching stages, e.g. B and C. Therefore, is an access signal is applied in a switching stage, e.g. B, to only the guide wires of the links extending from one crosspoint multiple, only one of the guide wires of the links extending to the selected crosspoint multiple of the next stage, e.g. C, can conduct this access signal. Moreover, if the potentials on the guide wires of the links extend from the access side to a selected crosspoint multiple, the ground or plus potential serving as the access signal may only exist on one of these guide wires.

This fact is utilized for marking the crosspoint elements which are to be subjected to the through-switching in the selected crosspoint multiples. The relay K in the selected offering amplifier AV1 of the switching stage B operates its contacts *k*. Each of the guide wires *ml* . . . *mi* of the *i* links extending from the access (left-hand) side to the associated crosspoint multiple KVB1 and connected to the *i* columns thereof is now leading via one wire of a number of access wires *mk*1 . . . *mki* one of the relays 1 . . . J which serve as the evaluation switching means. These evaluation switching means are only responsive to access potential and are arranged as part of the highway control SS*tr*1B. The corresponding access wires *mk*1 . . . *mki* of all guide wires extending to the crosspoint multiples KVB1 . . . KVB*m* of the first highway of the switching stage B are connected via a contact *k* of the relay K, associated with the respective crosspoint multiple, to the respective relay 1 . . . J (as is denoted by the multiple sign at the wires *mk*1 . . . *mki*).

After one group of these access wires has switched through, only one of the relays 1 . . . J will respond because only one of the guide wires conducts the access potential.

However, there are also situations when several links exist between two crosspoint multiples of neighboring switching stages. To this end only the relays 1 . . . J needs to be operated in a blocking chain, in order to make sure that each time only one of these relays will operate.

Therefore, the particular one of the relays 1 . . . J, which operates or responds, identifies the link between the selected crosspoint multiples of stages A and B which is to be used for the connecting path. Consequently, that relay also identifies the particular row of the crosspoint multiple of stage A and the particular column of the crosspoint multiple KVB1 of stage B to which this link is connected.

In a similar way, one of the relays 1 . . . P will respond as arranged in the highway control SS*tr*1C, thus designating one of the *p* number of links extending between the crosspoint multiple KVB1 and the crosspoint multiple KVC1, as well as the row of the crosspoint multiple KVB1 and the column of the crosspoint multiple KVC1 to which the marked or designated link is connected.

Thus, there is designated in stage B one row, as well as one column of the crosspoint multiple KVB1. There has also been determined the crosspoint element of this crosspoint multiple which is to be subjected to the through-switching, i.e. the element at the intersection of a row and column.

In a similar way there are also determined the crosspoint elements which are to be subjected to the through-switching in the other switching stages.

The particular one of the valuation relays 1 . . . J, which has responded or operated, e.g. relay J, now connects the seizing wire *ci* of the designated link to a switching pulse generator KJG by the action of its contact *i* via the wire *cki* and a closed contact *k* of the relay K. As is indicated by the multiple sign in the wire *cki*, the closed contact *i* connects the switching pulse generator to all of the corresponding wires within the highway 1, but the contacts *k* in the other wires are not closed.

Via the contact *i'*, the relay J now applies ground or plus potential to a marking wire *ki*, to which all crosspoint elements KP*i*1 . . . KP*ik* of the *i*-th column of the crosspoint multiple KVB1 are connected; at the same time, and via contact *i'* ground or plus potential is also applied to the corresponding marking wires which are multiple-connected to this marking wire, of the other crosspoint multiples of this stage.

As soon as e.g. the relay 1 has operated in the group of the evaluation relays 1 . . . P in the highway control SS*tr*1C, the seizing wire *c*1 of the designated link is connected via a closed contact 1 of this relay to the switching pulse generator KJG of the first highway of stage C. To this seizing wire *c*1 there are connected all crosspoint elements KP11 . . . KP*i*1 of the first row of the crosspoint multiple KVB1.

Of these crosspoint elements, as already described hereinbefore, only the crosspoint element KP*i*1 is applied to ground via the contact *i'* of the relay J in the highway control SS*tr*1B. Therefore, if the switching pulse generator KJG in the highway control SS*tr*1C, transmit a positive switching pulse, this will effect the crosspoint element KP*i*1 in the crosspoint multple KVB1 to respond.

Via the closed contact 1' of the relay 1, also the marking wire *k*1 of the crosspoint multiple KCV1 is applied to ground and, accordingly, one of the crosspoint elements KP1.1 . . . KP1.9 connected thereto, is permitted to respond as soon as there arrives a positive switching pulse via one of the seizing wires *c*1 . . . *cq* (controlled by the evaluation relays of stage D). If now the switching pulse generator KJG of the individually switching stages A, B, C, D . . . are all simultaneously caused to transmit a positive switching pulse, all of the crosspoint elements which are to be subjected to the through-switching, namely each time one in each switching stage, will be energized simultaneously.

If, fo rexample, for the purpose of a line testing to be carried out, it is desirable to subject only those switching stages to the through-switching which are lying within a predetermined section, then the instruction KB for transmitting a switching pulse is only given to the switching pulse generators of these particular stages.

Of course, the parts to be played by the contacts *i* and *i'* or 1 and 1' respectively, may be changed without further ado. In this case a reference potential is applied to the respective seizing wire, while the crosspoint elements of one column of all crosspoint multiples of one stage, are connected to the switching pulse generator transmitting a suitable switching pulse.

The circuit, as shown in FIG. 2, and in the course of the selection of a highway performed by the marker, each time one relay S*tr* is caused to be operated in the respective highway control SS*tr*1B or SS*tr*1C respectively. In this case one switching pulse generator may be provided in each highway control and, as is shown in FIG. 2, this generator may be connected, via a make contact of the respective relay S*tr*, to the line provided in common to all switching pulse generators of the same switching stage, extending to the marker via which there is given the switching instruction KB. Since only the relay S*tr* of one highway is energized in each switching stage, only the switching pulse generators of the selected highways will receive a switching instruction KB, by which they are cause to transmit or furnish a switching pulse.

If a crosspoint element, e.g. the crosspoint element KP*i*1 of the crosspoint multiple KV1 of stage B has responded, it will close its contact *kpi*1, and will cause the relay CA*i* to operate. Now the contact *cai*, as looped into the seizing wire *ci* will close, so that subsequently to the end of the positive switching pulse the relay CR1 as looped into the same wire, will be caused to operate. The contact *cri*, as arranged in the guide wire of the respective link, will now open and will mark the latter as being occupied (busy).

The response of a crosspoint element of the crosspoint multiple KVC1, e.g. the crosspoint element KP1.1, has likewise caused the relay CA1 and, upon termination of the switching pulse, the relay CR1 to operate. In this way a hold circuit for the crosspoint element KP*i*1 of the crosspoint multiple KVB1 has been completed from ground, via the winding of relay CR1, the closed contact *ca*1, the seizing wire *c*1, the crosspoint element KP*i*.1, the make contact *kpi*1 and the winding of relay CA*i*, towards minus. Likewise, there are completed hold circuits for the energized crosspoint elements of the other stages. As an advantage of the circuit shown in FIG. 2, there may be regarded the fact that the busy identification of the route search or path finding network is only effected upon termination of the switching pulse. In this way, and with respect to testing purposes, each individual one of the conditions appearing in a timely succession, namely offering accessing, marking the links, switching, busy identification in the route search or path finding network, are separately capable of being determined.

The conditions as to potential on the guide wires will not be subjected to any change as long as the switching pulse lasts, they are not being affected by the through-switching of the connecting path.

Further, it may also be regarded as an advantage that the auxiliary potentials for evaluating the access signal, as an auxiliary means for the link marking purpose in a stage, are only applied after the route search or path finding operation in this stage has already been completed. The route search or path finding, therefore, cannot be effected thereby.

While the principles of the invention have been described above in connection with specific apparatus and applications, it is to be understood that this desciption is made only by way of example and not as a limitation on the scope of the invention.

I claim:

1. A circuit for controlling a multi-stage crosspoint network comprising a plurality of cascaded stages, links extending from the outlets of a crosspoint multiple of each stage to the inlets of the crosspoint multiples of the next succeeding stage in the cascade, a route search network of guide wires associated with the links, means including amplifiers forming junctions associated with the crosspoint multiples, means for applying an offering signal of first polarity to said route search network at a desired point on the outlet side of the cascade, means for applying an access signal of opposite polarity to said route search network at a desired inlet to said cascade, one seizing wire associated with each link, and evaluation means responsive to said access signals on said guide wires for simultaneously applying a switch-through signal to selected seizing wires in each cascaded stage.

2. The circuit of claim 1 wherein a plurality of said links extend between two crosspoint multiples of neighboring switching stages, and lock out means associated with said plurality of links for selecting between the links.

3. The circuit of claim 1 wherein the number of said evaluation means corresponds to the number of said links which are connected at the access side to one crosspoint multiple, said evaluation means being arranged in common with all links extending to the access side of one switching stage.

4. The circuit of claim 3 in which the evaluation means includes means for pulsing the seizing wire of said links.

5. The circuit of claim 1 including means for dividing said network into switching sections, and means associated with each of said sections for operating the crosspoints in the associated highway via said seizing wires.

References Cited

UNITED STATES PATENTS

| | | |
|---|---|---|
| 3,310,633 | 3/1967 | Schonemeyer. |
| 3,349,186 | 10/1967 | Bereznak. |

KATHLEEN H. CLAFFY, Primary Examiner

WILLIAM A. HELVESTINE, Assistant Examiner